United States Patent [19]

Harmuth

[11] Patent Number: 5,134,408
[45] Date of Patent: Jul. 28, 1992

[54] DETECTION OF RADAR SIGNALS WITH LARGE RADAR SIGNATURES

[75] Inventor: Henning F. Harmuth, Potomac, Md.

[73] Assignee: Geophysical Survey Systems, Inc., North Salem, N.H.

[21] Appl. No.: 647,788

[22] Filed: Jan. 30, 1991

[51] Int. Cl.⁵ ............................................... G01S 7/28
[52] U.S. Cl. ............................................... 342/21
[58] Field of Search ............................................... 342/21, 201

[56] References Cited

U.S. PATENT DOCUMENTS

| | | | |
|---|---|---|---|
| 3,757,331 | 9/1973 | Moulton | 342/201 |
| 4,698,827 | 10/1987 | Kretchmer | 342/201 X |
| 4,907,001 | 3/1990 | Harmuth | 342/21 X |

Primary Examiner—Mark Hellner
Attorney, Agent, or Firm—Wolf, Greenfield & Sacks

[57] ABSTRACT

Method and apparatus for generating and receiving carrier-free radar pulses that can be detected even though they are heavily distorted by a target and have additive noise superimposed on them, or are in an environment of unwanted signals. The method is especially applicable to signals that are based on pulses with a duration of 1 nanosecond (ns) or less. The radar signature of typical targets from such signals is very large, which makes it hard to selectively receive return signals unless they are marked. Fine structure marking is not effective for such short duration pulses. A method for organizing the signal with coarse structure marking is described that allows the radar receiver to discriminate heavily distorted wanted signals from unwanted signals and noise without requiring large peak power at the transmitter. The disclosed method involves placing positive-going and negative-going pulses together in a pattern of contiguous pulses to form a character. Generating one or more time-delayed replicas of the character and summed selected ones together to form a signal with coarse structure marking. The delay time of each replica may vary and some replicas may have their polarity reversed before summing, but all are based on pulses that are short enough to imply that most return pulses would not be recognized by a receiver. However, the coarse structure of this invention marks the signal for selective reception. It renders the characters within it recognizable, and thereby enables the transmission of pulses without a fine structure marking which might otherwise be absorbed by the atmosphere.

21 Claims, 10 Drawing Sheets

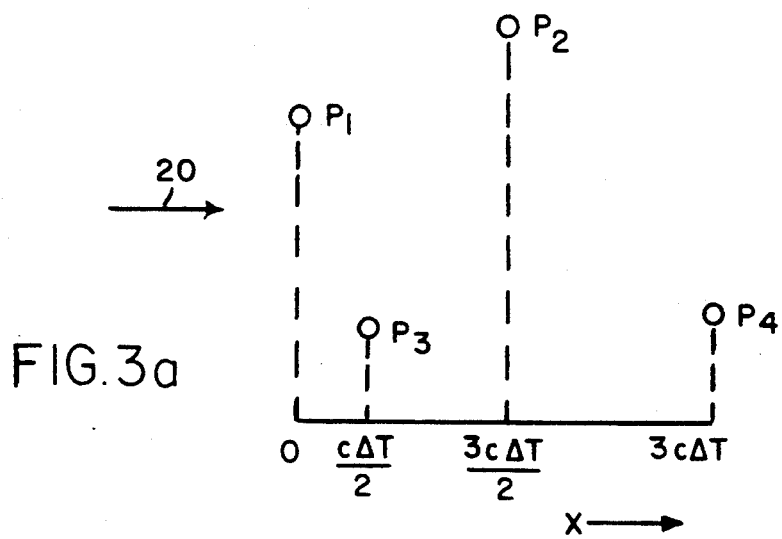
FIG.3a
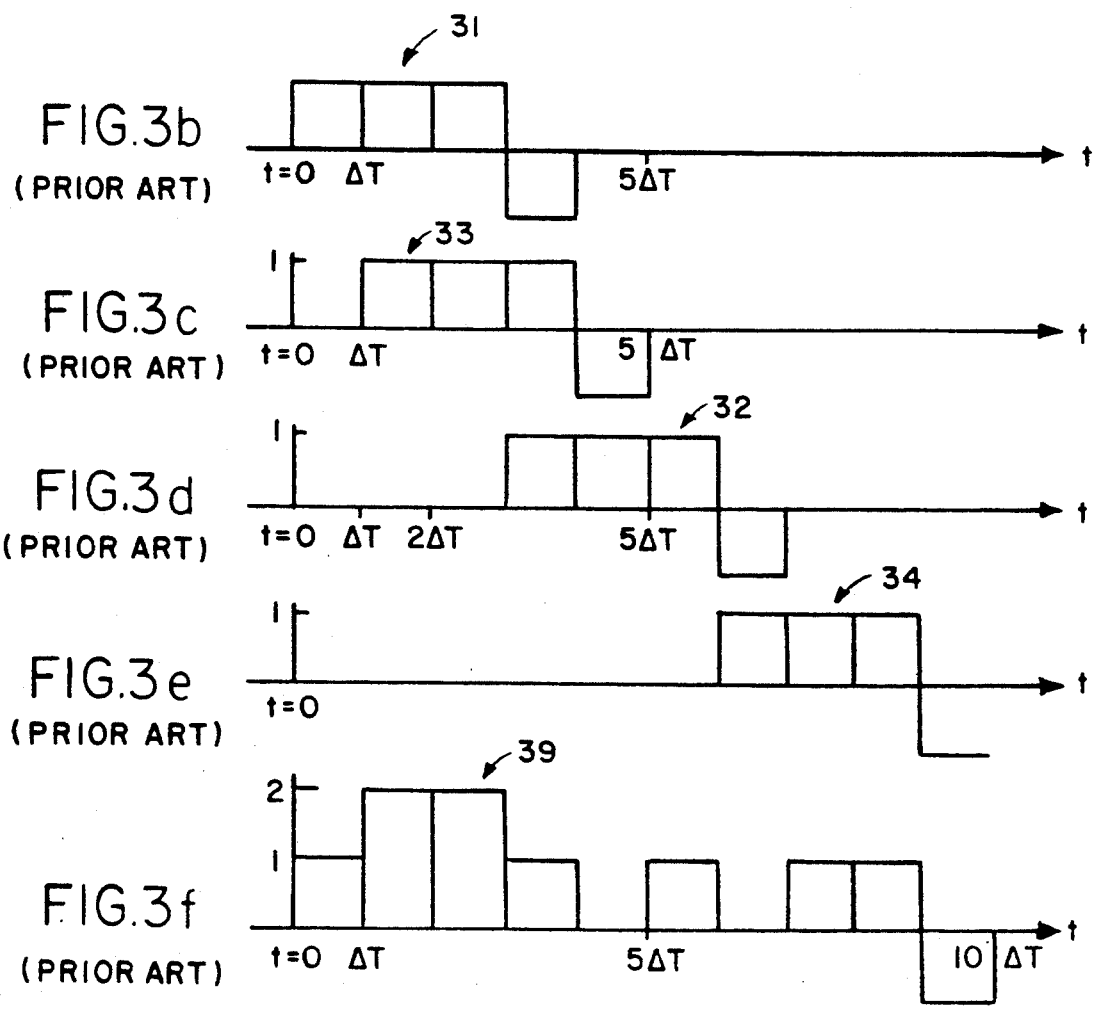
FIG.3b (PRIOR ART)
FIG.3c (PRIOR ART)
FIG.3d (PRIOR ART)
FIG.3e (PRIOR ART)
FIG.3f (PRIOR ART)

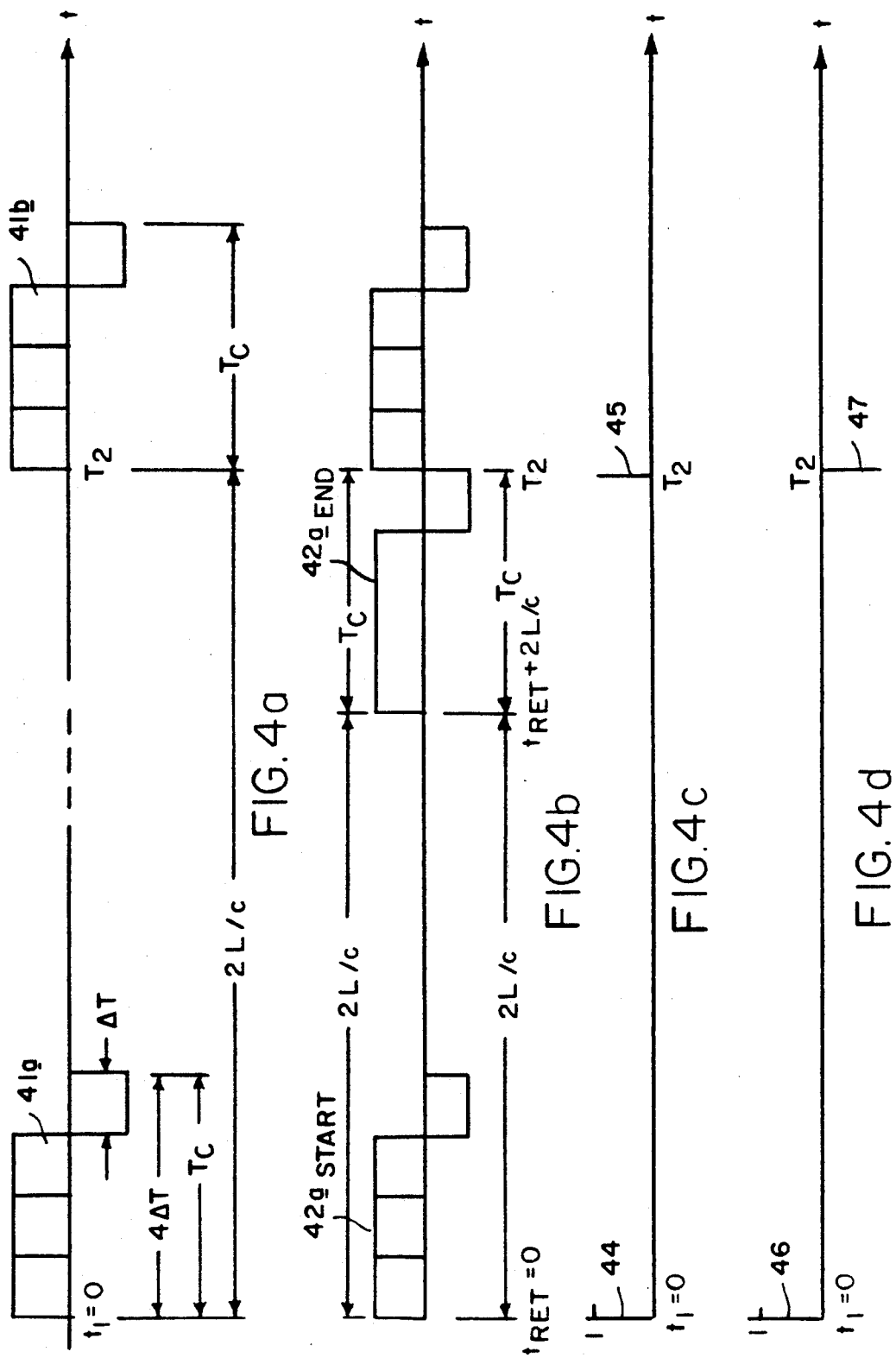

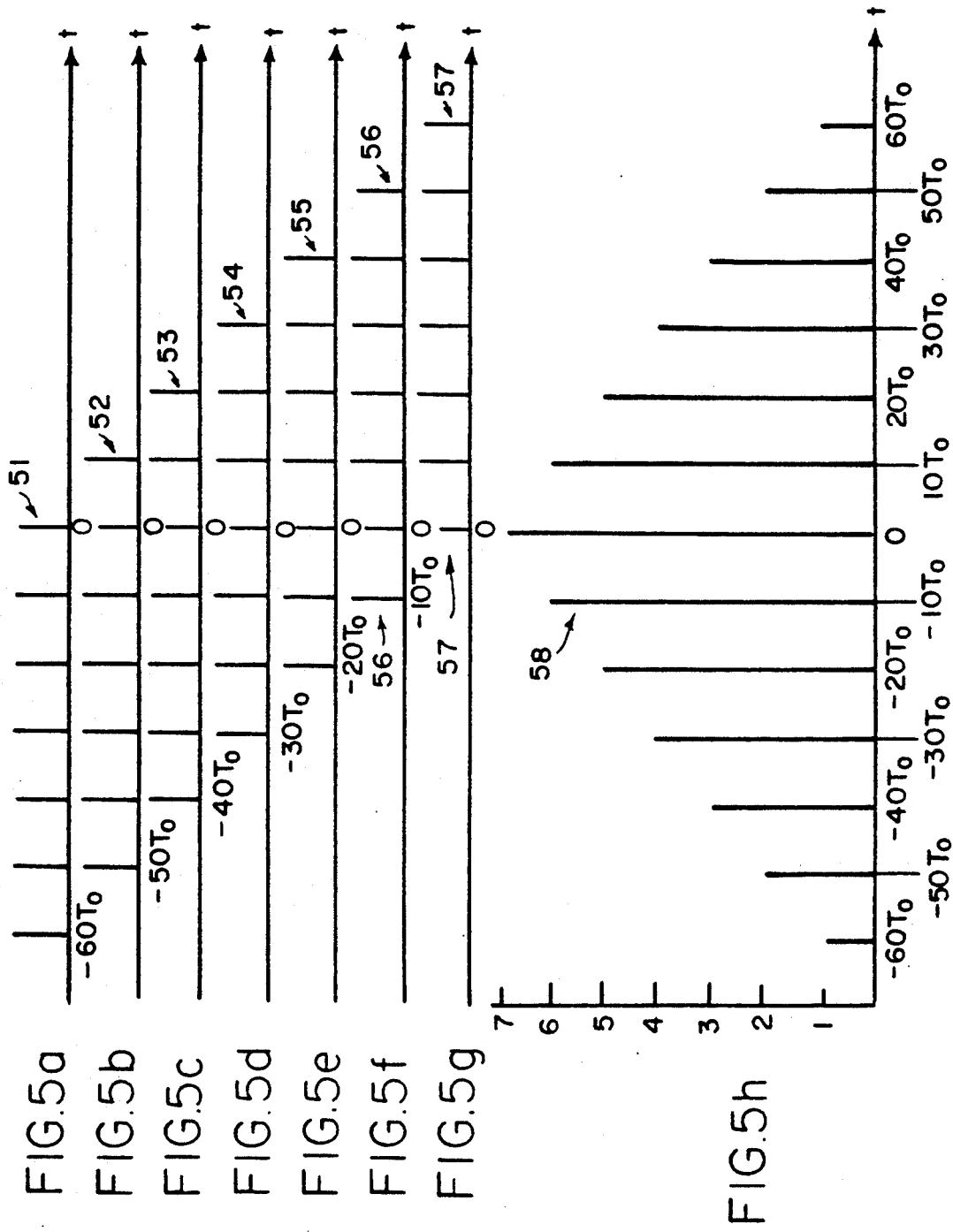

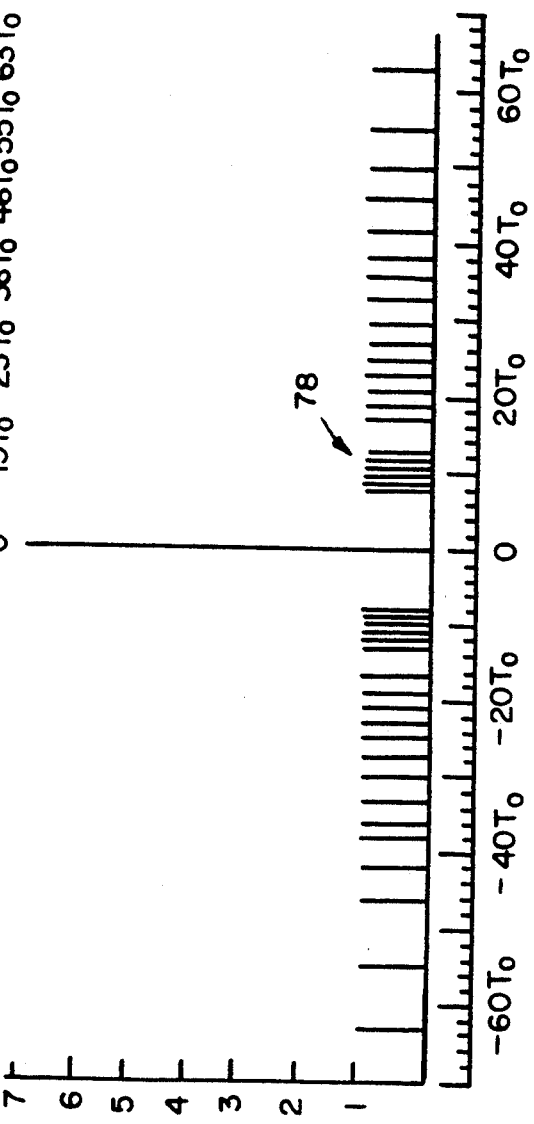

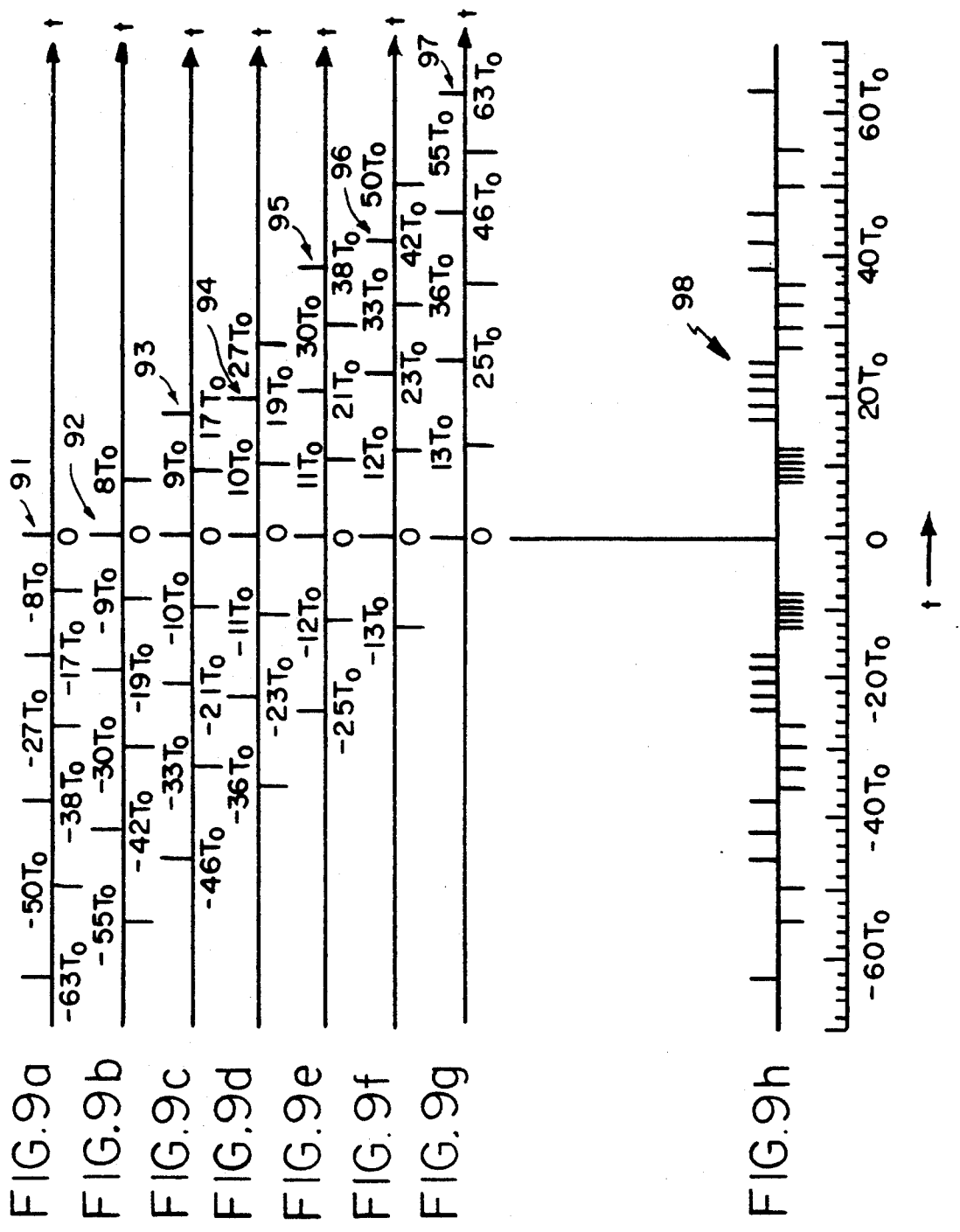

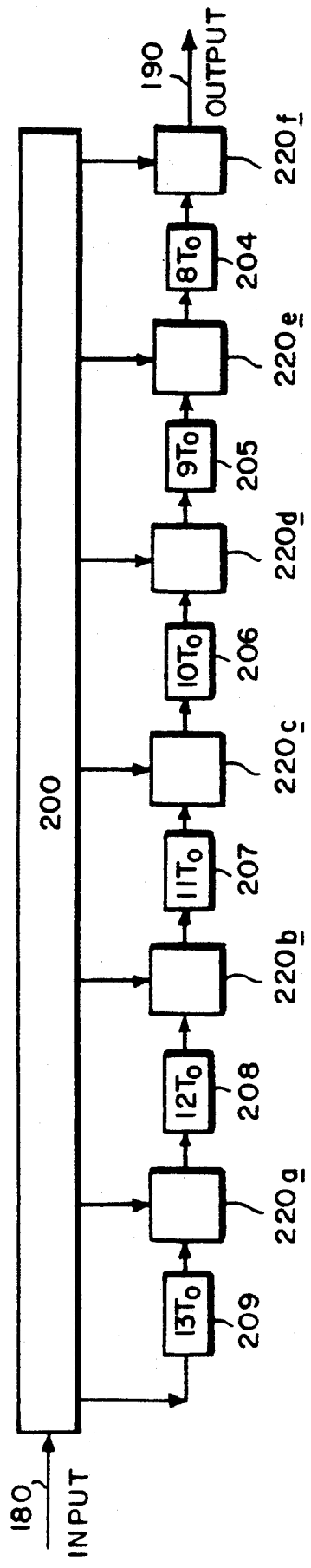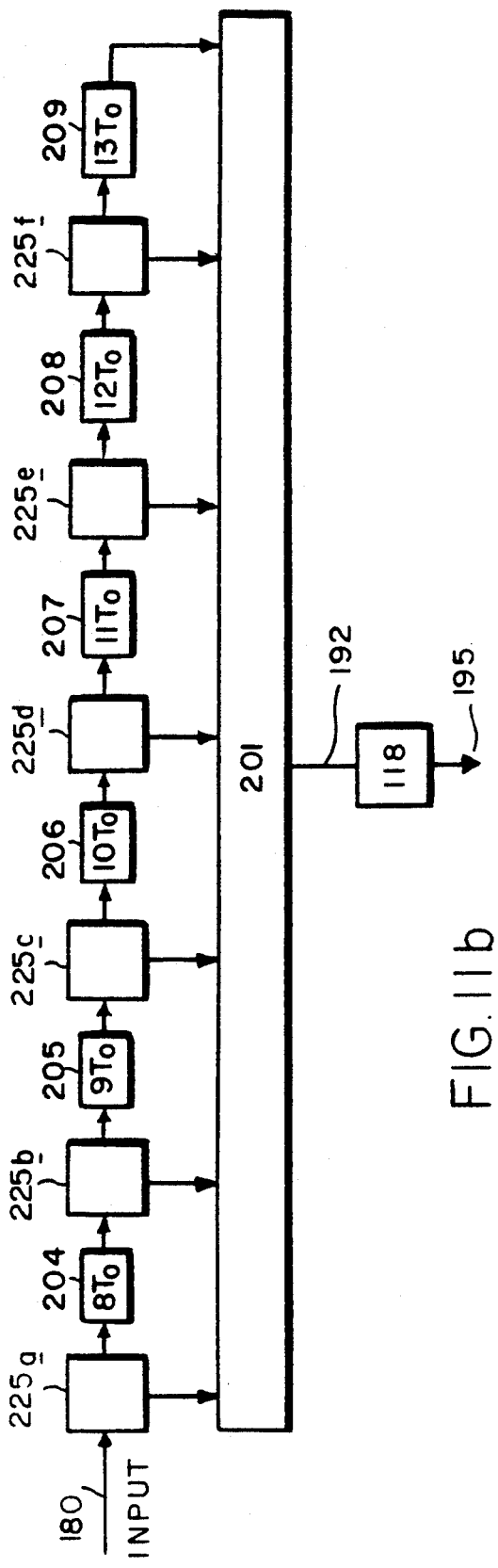
FIG.11a
FIG.11b

DETECTION OF RADAR SIGNALS WITH LARGE RADAR SIGNATURES

FIELD OF THE INVENTION

This invention relates to the selective reception of carrier free radar pulses that are returned after being heavily distorted by a target. More particularly, it relates to a method for position coding the pulses in the transmitted signal that enable the reception of heavily distorted signals and permit the transmission of short pulses through the atmosphere.

BACKGROUND OF THE INVENTION

Traditionally, a radar signal consisted of a burst of 100 to 1000 cycles of a fixed frequency sine wave. As an example, if the carrier frequency is 333 MHz, then one cycle is approximately 3 nanoseconds long, and the duration of a burst (i.e., pulse) might be between 300 nanoseconds (i.e., 100 cycles) and 3 microseconds. An electromagnetic wave travels approximately 100 meters in 333.3 ns. If the largest linear dimension of a target is small compared to 100 meters, then the target acts like a point scatterer and the returned signal will have essentially the same amplitude versus time variation as the transmitted burst. The slight distortions of the returned signal due to the finite extension of the target are called the radar signature. In principle, the radar signature can provide information about such features as the shape of the target and the material composition of its surface.

When a radar transmits a character consisting of a sequence of pulses, the received character has almost the same time variation as the transmitted character. However, this situation changes as the pulses are made shorter. For instance, a pulse duration of 33.3 ns implies that the wave will travel a distance of 10 meter during the duration of the pulse. Few targets are like point scatterers for such short pulses. As a result, the pulse, or the character consisting of a sequence of pulses, becomes heavily distorted, which is advantageous since it implies that more information is received about the shape and composition of the target. When a carrier frequency is used, the signal is still recognizable from the frequency of the carrier, despite the distortions. This is due to the particular feature of (periodic) sinusoidal waves, whereby the sum of any number of sinusoidal functions all with the same frequency, but different amplitudes and phases, always yields a sinusoidal function of that frequency. Hence, a burst with enough sinusoidal cycles to allow detection can be recognized by their carrier frequency regardless of the distortions.

Recently, radars have been developed theoretically and experimentally that do not use a sinusoidal carrier. These radars typically use pulses with a duration of 1ns or less. A 1ns pulse would require a carrier frequency of 100 GHz or greater, if conventional technology were used. But the propagation features of the atmosphere make such high carrier frequencies undesirable and unacceptable. Yet the short duration of the pulses yields enormous information due to the distortion of the pulses returned by the target. It is evident that short bursts are desirable, but employing a fine structure to mark them is ineffective as means that permit the selective reception of the wanted, distorted, signal in the presence of unwanted signals and noise. This invention teaches a method for using short duration pulses in a coarse structure that marks them for selective reception so that fine structure marking is not required. General background on carrier free radar and pulse position coding is available in the book by H. F. Harmuth, *Nonsinusoidal Waves for Radar and Radio Communication*, Academic Press, New York 1981, which is hereby incorporated by reference.

SUMMARY OF THE INVENTION

Accordingly, it is an object of this invention to provide a method for obtaining information about the shape and material composition of a radar target, using short radar pulses or characters made up of short pulses.

It is a further object of this invention to provide both a method and apparatus for permitting the selective reception of heavily distorted returned radar signals in the presence of unwanted signals and noise, without using a sinusoidal carrier.

It is still a further object of this invention to provide a method and apparatus which enables the transmission of short radar signals through the atmosphere and simultaneously permits the selective reception of heavily distorted returned signals in the presence of unwanted signals and noise, without the use of a sinusoidal carrier.

It is a further object of this invention to provide a method and apparatus for use in a radar system to replace the fine structure marking by a sinusoidal carrier with a coarse structure marking that is much longer than that of the pulse or the sequence of pulses making up a character.

Another object of this invention is to produce a radar signal with coarse structure by using position coding of characters.

It is a further object of this invention to provide a method and apparatus for use in a radar receiver that will replace the recognition of a character code within a backscattered signal by recognition of a coarse structure marking which is a particular temporal arrangement of characters.

The foregoing and other objects are achieved by using a carrier free radar system to transmit characters formed by pulses that do not have the fine structure marking of a sinusoidal wave carrier, but are organized into a coarse structure marking instead. The method involves placing positive going and negative going pulses together in a pattern of contiguous pulses, to form a character. Generating one or more delayed replicas of the character and summed selected ones together to form a signal with coarse structure marking. The delay time of each replica may vary and some replicas may have their polarity reversed before summing, but all are based on pulses that are short enough to imply that most returned characters would not be recognized by a receiver. Some carrier free radar systems use characters formed by positively going and negatively going pulses to mark the transmission of their signals. But, in the method and apparatus of this invention characters are organized into a coarse structure that is many times larger than a single character. The coarse structure of this invention marks the signal for selective reception, and thereby enables the transmission of pulses without a fine structure marking which might otherwise be absorbed by the atmosphere.

The invention will be better understood from the detailed description below, which should be read in conjunction with the accompanying drawing.

BRIEF DESCRIPTION OF THE DRAWING

In the drawing,

FIG. 3a is a diagramatic illustration of the same four points $P_1$ to $P_4$ shown in FIG. 2a, but rotated relative to the direction 20 of the impinging sequence of radar pulses, shown in FIG. 4a;

FIGS. 3b, 3c, 3d and 3e are the amplitude-versus-time representations of prior art signals returned from each of the rotated scattering points $P_1$ to $P_4$ when the radar signal of FIG. 4a is incident from direction 20 on those points;

FIG. 3f is the amplitude versus-time representation of a prior art signal that is the sum of the signals of prior art FIGS. 3b, 3c, 3d and 3e;

FIG. 4a is an amplitude-versus-time representation of the prior art character of FIG. 2a, transmitted at the times $t=0$ and $t=T_2$;

FIG. 4b is an amplitude versus-time diagram that shows the character transmitted at $t=0$ returned at $t=t_{RET}$;

FIG. 4c is a simplified representation of FIG. 4a wherein, instead of showing the entire character, it is indicated by a positive pulse of zero duration at the beginning of the character;

FIG. 4d is a modified version of FIG. 4c, wherein the character at time $T_2$ is characterized by a negative pulse because the amplitudes of all n pulses are reversed;

FIG. 5a is a pulse diagram showing 7 equally spaced characters beginning at the times $-60T_o$, $-50T_o$, $-40T_o$, $-30T_o$, $-20T_o$, $-10T_o$ and 0, without regard for the particular pulse sequence;

FIG. 5b to 5e pulse diagrams showing the sequences of FIG. 5a delayed by $10T_o$, $20T_o$, $30T_o$, $40T_o$, $50T_o$, and $60T_o$, respectively;

FIG. 5h is a pulse diagram of the sum of the waveforms of FIGS. 5a to 5g;

FIG. 7a is a pulse diagram showing characters similar to those in FIG. 5a, but with the unequal spaced intervals $-63T_o$, $-50T_o$, $-38T_o$, $-27_o$, $-17T_o$, $-8T_o$ and 0;

FIGS. 7b to 7g are pulse diagrams of the sequence of FIG. 7a delayed by $8T_o$, $17T_o$, $27T_o$, $38T_o$, $50T_o$ and $63T_o$, respectively;

FIG. 7h is a pulse diagram of the sum of the pulse sequences of FIGS. 7a to 7g;

FIG. 9a is a pulse diagram wherein the sequence of FIG. 7a is modified so that characters at u the times $-50T_o$, $-27T_o$ and $-8T_o$ are transmitted with reversed amplitude;

FIGS. 9b to 9g are pulse diagrams showing the pulse sequences of FIG. 9a, delayed by $8T_o$, $17T_o$, $27T_o$, $38T_o$, $50T_o$, $63T_o$;

FIG. 9h is a pulse sequence diagram illustrating the sum of the pulse sequences represented by FIG. 9a through 9g;

FIG. 10 is a block diagram of a circuit for generating the pulse sequence of FIG. 9a; and FIG. 11a and 11b are block diagrams of two variations of the circuit of FIG. 8.

DETAILED DESCRIPTION

Figure 1:
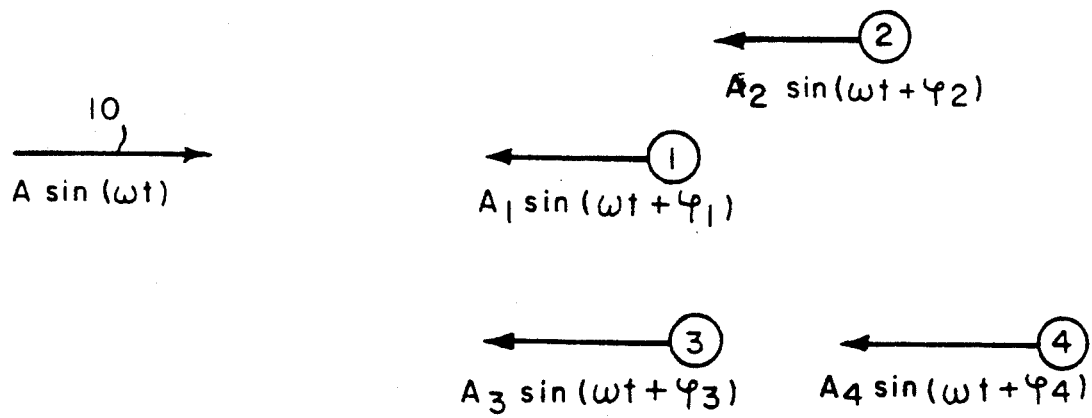
FIG. 1 is a diagrammatic illustration showing the backscattering of an incident periodic sinusoidal wave by four arbitrary scattering points.

FIG. 1 shows a periodic sinusoidal wave, aSIN($\omega$t), transmitted along path 10, and striking a target represented by four small scattering points 1, 2, 3 and 4. Each scattering point returns a sinusoidal wave with the same frequency $\omega$ but with amplitude $A_i$ and phase $\phi_i$, where $i=1, 2, 3, 4$. The sum of these four waves can be represented as;

$$A_o\sin(\omega t + \phi_o) = \sum_{i=1}^{4} A_i \sin(\omega t + \phi_i).$$

The amplitude $A_o$ and the phase $\phi_o$ will depend on the relative position, as well as the number of scattering points, but the frequency $\omega$ will not be changed. A frequency selective receiver tuned to the frequency $\omega$ can discriminate the backscattered wave from waves with other frequencies, including waves caused by noise. Although this result applies only to periodic sinusoidal waves, in practice it can be applied to sinusoidal pulses having "sufficiently many" cycles rather than infinitely many cycles. "Sufficiently many" cycles in radar typically means 100 or more cycles.

Figure 2A:
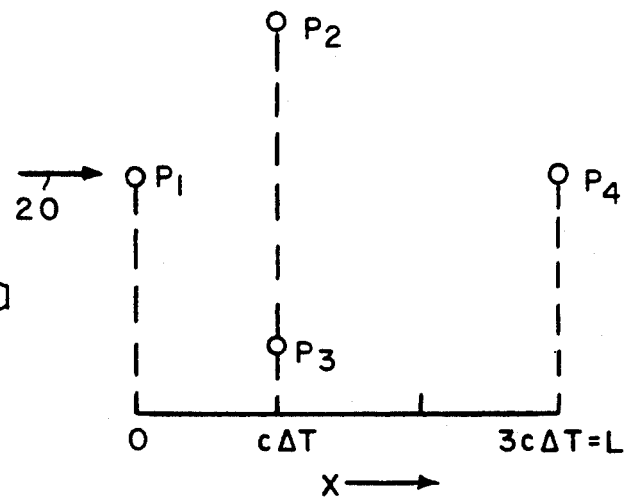
FIG. 2a is a diagramatic illustration showing four point scatterers situated to represent the extremes of the fuselage and the wingtips of an aircraft.

Consider now the target of FIG. 2a with its four equally reflective scattering points $P_1$, $P_2$, $P_3$ and $P_4$. Let the carrier free sequence of contiguous pulses 22, shown in FIG. 2b, strike the target of FIG. 2a from direction 20. Waveform 21, consists of a sequence of positive going and negative going pulses. No sinusoidal carrier is used. In practice, it is difficult to radiate a wave with a DC component. But waveform 21 can be incorporated into a longer pulse sequence that has no inverted form of waveform 21.

Figure 2B:
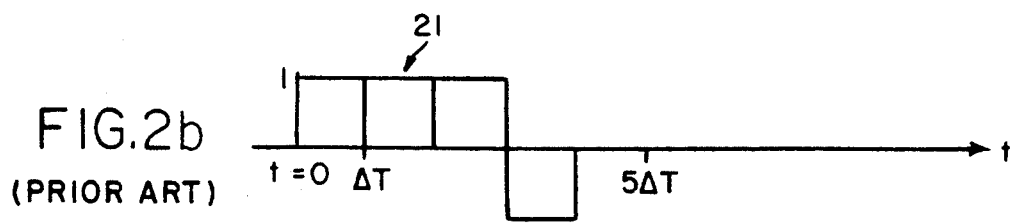
FIGS. 2b, 2c, 2d and 2e are amplitude-versus-time representations of prior art signals returned from each of the four scattering points of FIG. 2a when the sequence of radar pulses shown in FIG. 4a is incident on those points from direction 20.
Figure 2C:
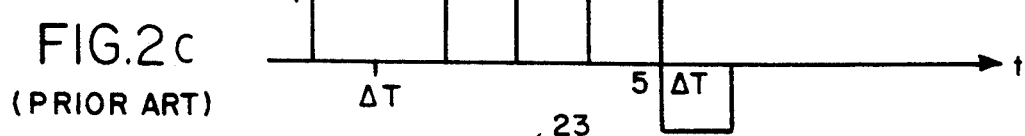
Figure 2D:
Figure 2E:

Let the radiated character reach the four scattering points from direction 20. Scattering points $P_1$-$P_4$ are assumed to be equally large. First, point $P_1$ returns the signal 21 at time $t=0$, as shown in FIG. 2b. After a delay of $2\Delta T$, the points $P_2$ and $P_3$ return the signals 22 and 23 as shown in FIGS. 20c and 20d. The signals 22 and 23 take a time $2\Delta T$, rather than $\Delta T$, to return after the signal from point $P_1$ because the wave must travel the distance $c\Delta T$ twice (i.e., where c is the speed of light in the medium) relative to signal 21. Finally, scattering point $P_4$ returns the signal 24, shown in FIG. 2e, with a delay of $6\Delta T$ relative to the return of signal 21. Waveform 29 in FIG. 2f is the sum of the four received backscattered signals (i.e., waveforms 21-24).

Turning now to FIG. 3a, the same four scattering points of FIG. 2a are shown rotated relative to the direction of the incident radar signal 20. The four scattering points $P_1$ to $P_4$ now return the signals 31, 32, 33, and 34 illustrated in FIGS. 3b, 3c, 3d, and 3e, respectively. Their sum (i.e., the received backscattered signal) is shown as waveform 39 in FIG. 3f. This signal is completely different from signal 29 in FIG. 2f, which implies that waveform 39 contains information about the position of the four scattering points P1 to P4. Practically, this means that waveform 39 will be hard to receive selectively, but that it contains much information about the shape of the target as well as its materials (e.g., metal, plastic, absorbing materials over metal, etc.).

Figure 2F:
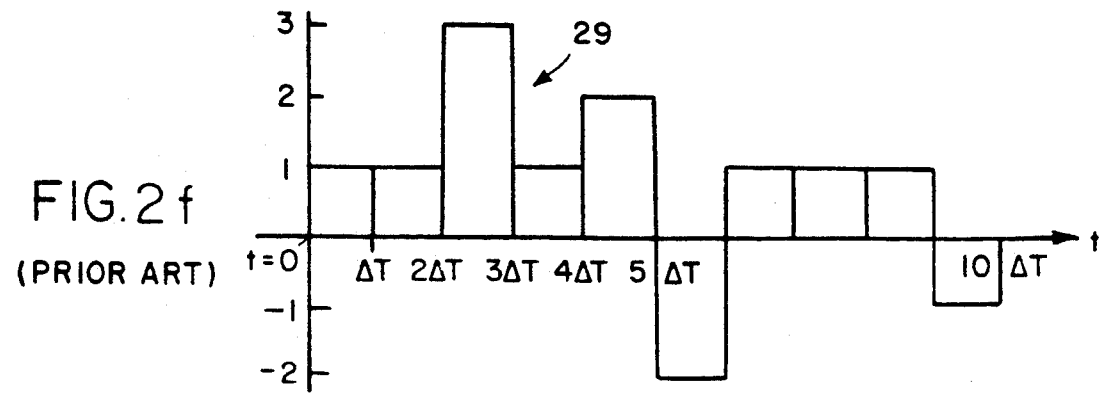
FIG. 2f is the amplitude versus time representation of a prior art signal that is the sum of the return signals of prior art FIGS. 2b, 2c, 2d and 2e.

In the absence of noise and unwanted signals, signals 29 and 39 of FIGS. 2f and 3f can be used to extract the information about shape and material composition. Mathematical methods of doing so are known under the generic term "inverse processes." These methods are not a topic of this disclosure and are, therefore, not discussed herein.

But in most applications of radar, noise is received with the signal and there are unwanted signals present due to other radars or radio transmitters. The problem with signals 29 and 39 of FIG. 2f or 3f is, how to distinguish them from noise and unwanted signals. In theory, the transmitter could radiate so much energy that the returned signals 29 and 39 would be much larger than any noise or unwanted signals. Practically, however, this is possible only in rare cases since the peak power of the radiated signal cannot be sufficiently increased for a transmitter. And, in the case of one radar receiving another radar's signals, even unlimited peak power would not solve the problem.

If a sinusoidal carrier is used, the two signals 29 and 39 could be recognized by their respective carrier frequencies. However, this approach calls for "many cycles" per pulse. A pulse width of 1ns or less requires a carrier frequency of 94 GHz or greater. Electromagnetic waves with such high frequencies are too strongly absorbed by rain and fog to permit all-weather operation, and even in clear weather the absorption in the atmosphere limits their useful range to perhaps 20 km. Hence, the use of a fine structure, as provided by a carrier, for marking the wanted signal is generally not possible with pulses of duration 1ns or less.

Fine structure means that the individual pulses of a character, or pulse sequence, have a finer structure within them (i.e., fine structure marking) that is typically a sinusoidal carrier. Coarse structure means that the individual pulse of a character or pulse sequence is itself the fine structure element, and instead of it containing the marker, it is contained within the marker. The signals are marked by a structure that is coarser than that of the pulse not finer than it. Up to this point, fine structure marking has been described as the most useful method for assisting reception of echo signals. We have also seen that a short character will not mark the character for selective reception. However, including the short character within a coarse structure marking is a useful means for assisting reception. The remainder of this disclosure shows a method and apparatus whereby marking short characters with a coarse structure enables the reception of heavily distorted signals, and permits long range all weather operation without any fine structure marking.

Consider FIG. 4a, which shows the transmitted character 41a reaching the leading edge of a target at time $T_1=0$, and a second transmitted character 41b reaching the target at time $t=T_2$. Each character is a sequence of contiguous short pulses which, in this example, are arranged in a $+++-$ pattern of duration $T_c=4\Delta T$. FIG. 4b shows the character $41a_{start}$. $41a_{start}$ is the character 41a as it arrives at the radar receiver at the time $t_{ret}=0$ after being backscattered from the nearest point of the target. 41a will also be backscattered from the farthest point of that target. That character is denoted as $42a_{end}$ in FIG. 4b. If L is the longest linear dimension of the target in the direction of propagation of the incident wave, then the leading edge of character $42a_{end}$ reaches the receiver 2L/c seconds after the leading edge of $42a_{start}$ (i.e., at time $t=t_{ret}+2L/c$) The trailing edge of $42a_{end}$ will arrive at the receiver at time $t=t_{ret}+(2L/c)+T_c$ as is illustrated in FIG. 4b. It is evident that the time $t=(2L/c)+T_c$ is the duration of the distorted, backscattered character received from the target. If the value of L is selected such that it is at least as large as the longest linear dimension of the targets of interest, then the method of this invention shows how, by spacing adjacent characters at intervals of time, $T_2$, at least as large as $(2L/c+T_c)$, a sequence of characters can be formed with coarse structure marking that enables selective reception of backscattered signals with large radar signatures.

A large interval is herein used to mean an interval that is large compared to a single pulse or character, and at least as large $(2L/c+T_c)$ for the largest target of interest.

Since the details of the time variation of a particular character, such as 41a, are of no importance in this discussion of coarse structure marking, the details of each character will not be plotted beyond FIG. 4b. Instead, the beginning of a character will be indicated by a pulse or marker, such as pulse 42 at time $T=0$, and pulse 44 at time $T_2$ in FIG. 4c. In addition to marking the beginning of a character, the markers will also represent the amplitude of the signal. A marker that is twice as high as another indicates that the character represented by it has twice the amplitude of the character represented by the other marker. This concept represents characters with reversed amplitudes by inverting the marker. For example, FIG. 4d shows marker 46 (representing character 41a) transmitted at the time $T_1=0$, and transmitted again with reversed amplitude as marker 47 at time $T_2$.

Using the marker convention to represent transmitted characters, FIG. 5a shows waveform 51 which is a sequence of seven equal markers that are received at times $-60T_o, -50T_o, \ldots -10T_o, 0$. The time scales of FIGS. 4 and 5 are connected by choosing $T_2 \geq 10T_0$. FIGS. 5b–5g show waveforms 52–57 which are the same sequence of markers as waveform 51, but delayed from waveform 51 by $10T_o, 20T_o, \ldots, 60T_o$, respectively. FIG. 5h shows waveform 58 which is the sum of the received waveforms 51–57, as shown in FIGS. 5a–5g. At the time $t=0$, the impulse amplitude of waveform 58 is seven times as large as the unit impulses of received waveform 51 in FIG. 5a, which implies an improvement of the signal to noise power ratio by 20log (7)=19.9 dB. Hence, the delay intervals in a sequence of characters such as waveform 51 in FIG. 5a forms a coarse structure marking that permits an improvement of the signal to noise ratio comparable to that obtained by a frequency band pass filter using the fine structure of a pulse modulated sine wave.

Figure 6:
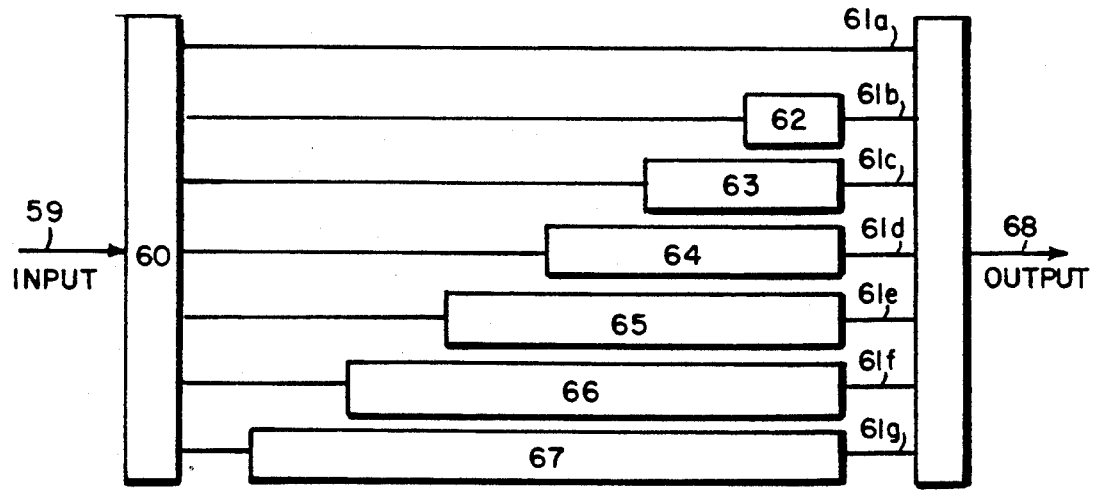
FIG. 6 is a block diagram of a circuit that implements the time diagram of FIGS. 5a-5h.

A circuit for generating the waveform 58 of FIG. 5h is shown in FIG. 6. This circuit can be used in either a radar transmitter or a radar receiver. As a transmitter, it will generate waveform 51 in FIG. 5a if a single character is fed at point 59 into hybrid coupler 60, or it will generate waveform 58 in FIG. 5h if waveform 51 is fed input at point 59 into hybrid couple 60. But, more importantly, it is a receiving circuit that will selectively receive and enhance the reception of waveform 51.

Since the circuit of FIG. 6 as a transmitting circuit is straight forward and obvious to those practiced in the art, it will not be described further. However, its operation as a receiver goes to the heart of this invention and is described below. The incoming signal at point 59 is distributed by hybrid coupler 60 to delay circuits 62–67. Delay circuit 62 delays the input signal at 59 by $10T_o$. Delay circuit 63 delays it by $20T_O$ Delay circuit 64 by $30T_o$, delay 65 by $40T_o$, delay 66 by 50 $T_o$, and delay 67 by $60T_o$. The input signal 61a plus the outputs from the six delay circuits 62–67 are summed by summer 69. The inputs to summer 69 are 61a–61g. If waveform 51 is present at input 59, then the signals at points 61a–61g correspond to the signals 51–57 in FIGS. 5a–5g, respectively, and output 68 in FIG. 6 is waveform 58 of FIG. 5h. The main lobe of 58 at output 68 is seven times the amplitude of the signal 51 input to the circuit at point 59. Reception of waveform 51 with coarse structure marking is, therefore, much enhanced by the circuit of FIG. 6.

Figure 8:
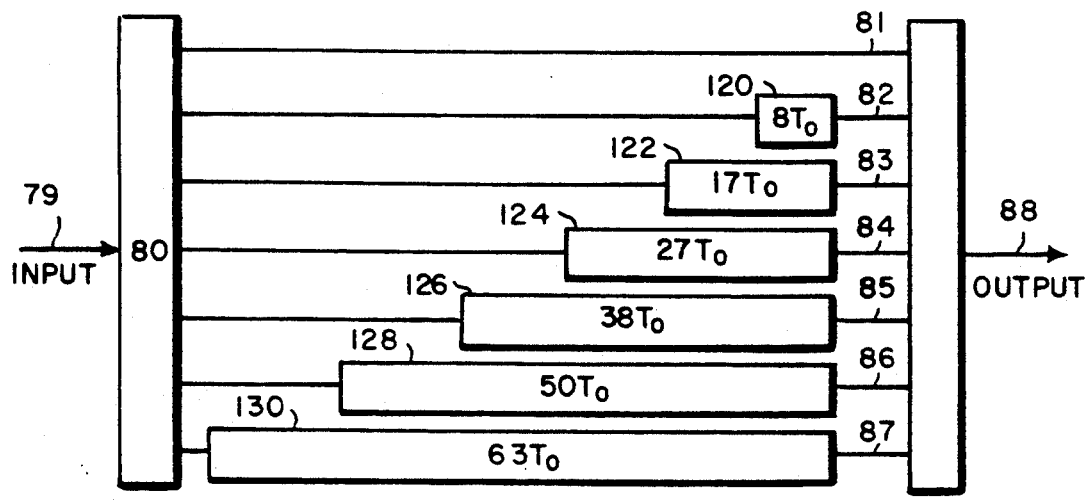
FIG. 8 is a block diagram of a circuit that uses hybrid couplers and delay circuits with delay times $8T_o$ to $63T_o$ to generate the signal of FIG. 7h.

A drawback of the enhanced received signal 58 in FIG. 5h is that there is not only the sum of 7 characters at the time $t=0$, but the sum of 6, 5, 4, 3, 2, 1 characters at the times $\pm 10T_o$, $\pm 20T_o$, $\pm 30T_o$, $\pm 40T_o$, $\pm 50T_o$ and $\pm 60T_o$. These side lobes can be reduced in the received signal by transmitting waveform 71 of FIG. 7a rather than waveform 51 in FIG. 5a. The coarse structure marking of waveform 51 involves delay times of $-60T_o$, $-50T_o$, $-40T_o$, $-30T_o$, $-20T_o$, $-10T_o$ and 0. Signal 71 marks the signal with times $-63T_o$, $-50T_o$, $-38T_o$, $-27T_o$, $-17T_o$, $-8T_o$ and $0_o$. The time scales of FIGS. 4 and 7 are connected by choosing $T_2 > 8T_0$. If waveform 71 is present at input 79 of the receiving circuit of FIG. 8, the signals 72, 73, 74, 75, 76 and 77 of FIGS. 7b to 7g will be present at points 81 87 of FIG. 8. FIG. 8 is similar to the circuit of FIG. 6, except that the delay times of the six delay circuits 120, 122, 124, 126, 128 and 130 are $8T_o$, $17T_o$, $27T_o$, $38T_o$, $50T_o$ and $63T_o$, respectively. Summer 89 sums the signals at points 81–87. If the waveforms at 81–87 are the signals 71–77 of FIGS. 7a to 7g, then the signal at 88 is waveform 78 of FIG. 7h. Waveform 78 has one large main lobe and many small side lobes, which is a significant improvement over waveform 58 of FIG. 5h.

Figure 10:
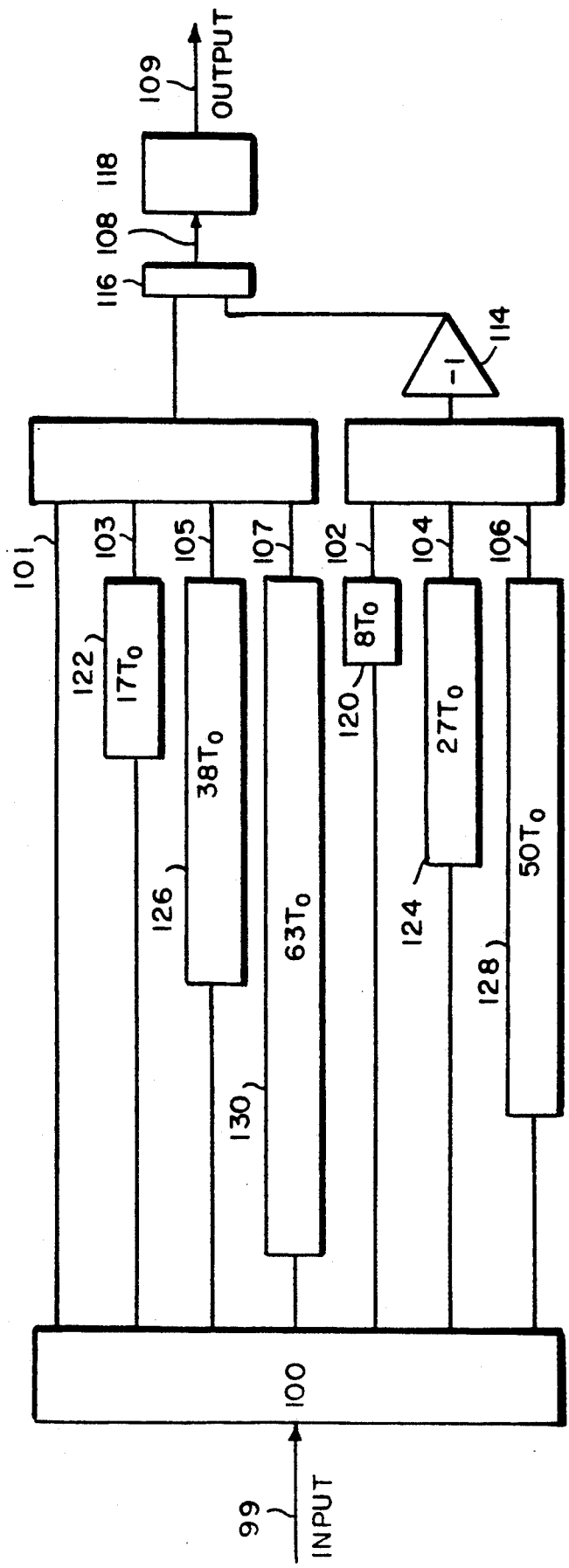

A further improvement over the enhanced received signal 78 of FIG. 7h is possible by radiating the characters alternately with reversed amplitudes as illustrated in waveform 91 of FIG. 9a. If waveform 91 of FIG. 9a is present at input 99 of the circuit shown in FIG. 10, then the signal at point 109 in FIG. 10 will be waveform 98. FIG. 10 is almost the same as the circuit of FIG. 8, but the characters with delays $8T_o$, $27T_o$, $50T_o$ are summed separately by summer 112, and the sum is amplitude reversed by the inverting amplifier 114 before being summed in summer 116 with the characters of delays 0, $17T_o$, $38T_o$, and $63T_o$ from summer 110. The circuit of FIG. 10 develops all the waveforms 91–98 of FIGS. 9a–9h, when waveform 91 is present at input 99. Waveform 91 exists on line 101 if waveform 91 is input into the circuit at input 99. Waveform 92 is formed by delaying the waveform at input 99 by $8T_o$ in circuit 120 and inverting it in circuit 114. Waveform 93 is formed by delaying input 99 by $17T_o$ in circuit 122. Waveform 94 is formed by delaying input 99 by $27T_o$ in circuit 124 and inverting it in circuit 114. Waveform 95 is formed by delaying 99 by $38T_o$ in circuit 126. Waveform 96 is formed by delaying 99 by $50T_o$ in circuit 128 and inverting it in circuit 114. Waveform 97 is formed by delaying input 99 by $63T_o$ in circuit 130. These waveforms are summed by summing circuit 116. Consequently, the waveform at point 108 is waveform 98. Waveform 98 is the sum of waveforms 91–97. Waveform 98 has positive as well as negative side lobes. This feature is important if returns from several targets are received, since all positive side lobes of different targets would add up by coincidence faster than a mixture of positive and negative side lobes. Signal 98, which is produced at point 108 in FIG. 10 is further processed by doppler processing unit 118 to obtain an added doppler processing gain so output 109 is further enhanced than shown in waveform 98 in FIG. 9h.

If the total number of characters in the transmitted sequence is odd then either $(n-1)/2$ or $(n+1)/2$ are amplitude reversed (i.e., amplified by a gain of $-1$). FIGS. 9a–9g show seven characters. Three were chosen to be negative and four were chosen to be positive, but the number of positive and negative characters could have been switched. If n is an even number, then $n/2$ characters are amplitude reversed.

There are a number of obvious variations of the circuits of FIGS. 6, 8 and 10. FIGS. 11a and 11b show two variations of the circuit of FIG. 8 distinguished by a reduction of the longest delay circuit from $64T_o$ in FIG. 8, to $13T_o$.

FIG. 11a distributes the input signal 180 through hybrid coupler 200 to a series arrangement of hybrid couplers $220_a$–$220_f$ and delay circuits 204–209 with delay times $8T_o$, $9T_o$, $10T_o$, $11T_o$, $12T_o$ and $13T_o$, respectively. The output signal 190 is produced at the output of hybrid coupler $220_f$.

FIG. 11b uses the same delay circuits 204 209, but different hybrid couplers to perform the functionality of FIG. 8 and FIG. 11a. In 11b, the input signal 180 is fed into the first hybrid coupler 225 in the series chain of hybrid couplers and delay circuits. The output waveform 192, produced at the output of hybrid coupler 201, is then fed into Doppler processing unit 118 to obtain output signal 195.

The use of 7 repetitions of the same character (i.e., $k=7$), either with amplitude reversal (e.g, FIG. 9) or without amplitude reversal (e.g. FIG. 7) to generate a signal with coarse structure marking, can be selectively received to produce a sum character with a main lobe seven times (i.e., k times) the amplitude of the individual character. This implies an increase of the signal to noise power ratio by 20log (k) dB. A coarse structure marking with $k=7$ positions has been used in the above description of the invention, however, structures with k of up to 24 are practical. For $k=24$, a signal-to noise ratio increase of $20\log(24)=27.6$ dB is obtained, which, in the presence of a Doppler shift is about the maximum possible, due to the time required for such a long signal. However, if Doppler processing is used on the output signals such as illustrated in function 118 of FIGS. 10 and 11b, then an additional Doppler processing gain is obtained (see H. F. Harmuth, *Nonsinusoidal Waves for Radar and Radio Communication*). In 100ms, the Doppler processor will be able to sum $i=100$ signals, yielding a signal to noise ratio gain due to Doppler processing of $10\log (i^2) = 20\log (i) = 40$ dB. The total processing gain for $k=24$, without making use of the time variation of the individual characters, (e.g., in FIG. 4a) is thus 27.6 dB+40 dB=67.6 dB. This is a practically acceptable value, particularly since the time for Doppler processing can be extended from 100 ms to 1s with a further gain of 20 dB without becoming unrealistic.

Such processing gains are sufficient to suppress noise and unwanted signals, and to obtain the wanted signal essentially in the form shown in FIGS. 2f and 3f, which may then be processed to obtain information about shape and material composition of the target.

Accordingly, the invention herein described teaches that to obtain information about shape and material composition of a radar target, a pulse or a sequence of contiguous pulses, referred to as a character, may be employed, with pulses so short that the returned pulse or character is no longer recognizable as the transmitted one. In order to make such a highly distorted signal recognizable it must be marked in some way. Fine structure marking fails when pulses with a duration of 1 ns or less are used, since carrier frequencies of about 100 GHz and more would be required, and electromagnetic energy with such high frequencies is absorbed by the atmosphere quite efficiently. As shown above, coarse structure marking can be used to replace the function that fine structure marking has conventionally performed. An ideal way to produce such signals with coarse structure is to use position coding, but there are many other ways of coding that yield results which are almost as good.

Although preferred embodiments of the invention have been set forth in detail, it is to be understood that this is for the purpose of illustrating the invention by way of example only, and should not be construed as limiting the scope of the invention, since it is apparent that many changes can be made to the disclosed embodiments by those skilled in the art to suit particular applications.

Accordingly, the invention is defined not by the illustrative embodiment, but only by the following claims and their equivalents.

What is claimed is:

1. A radar transmission system comprising:
    means for generating positive going and negative going pulses, without a sinusoidal carrier as a fine structure marking;
    means for generating a first character by placing said positive going and negative going pulses together in a pattern of contiguous pulses;
    means for generating at least one additional character, each said additional character being a time delayed replication of the first character;
    means for summing selected characters from among the plurality of characters, to form a signal with coarse structure marking which is long compared to said pulses; and
    means for transmitting said signal with coarse structure marking as a radar signal.

2. A radar transmission system comprising:
    means for generating positive going and negative going pulses, without a sinusoidal carrier as a fine structure marking;
    means for generating a first character by placing said positive going and negative going pulses together in a pattern of contiguous pulses;
    means for generating at least one additional character, each said additional character being a time delayed replication of the first character;
    means for reversing the polarity of any of said delayed characters and said first character;
    means for summing selected characters from among the plurality of characters, to form a signal with coarse structure marking which is long compared to said pulses; and
    means for transmitting said signal with coarse structure marking as a radar signal.

3. The radar transmission system of either of claims 1 or 2 wherein each additional delayed character is delayed by a time that is different from all the other delayed characters.

4. The radar transmission system of claim 3 wherein each delayed character is delayed by a time that is greater than the signature of the largest expected target.

5. The radar transmission system of claim 3 wherein each character within the signal with coarse structure marking is long enough to assure good all weather radar transmission for distances exceeding 20 km.

6. A method of forming a radar signal, comprising the steps of:
    generating positive going and negative going pulses without a sinusoidal carrier as a fine structure marking;
    generating a first character by placing said positive-going and negative going pulses together in a pattern of contiguous pulses;
    generating at least one additional character, each said additional character being a time delayed replication of the first character;
    summing selected characters from among the plurality of characters to form a signal with coarse structure marking that is long compared to said pulses.

7. The method of forming the radar signal of claim 3 wherein the last step is preceded by inverting selected characters from among the plurality of characters and the first character.

8. The method of forming a radar signal of either of claims 6 or 7 wherein each said addition character is delayed by a time that is different from all the other delayed characters.

9. The method of forming a radar signal of claim 8 wherein each additional character is delayed by a time that is greater than the signature of the largest expected target.

10. The method of claim 8 wherein each character is long enough to assure good all weather radar transmission for distances exceeding 20 km.

11. A radar transmission system comprising:
    means for generating positive going and negative going pulses, without a sinusoidal carrier as a fine structure marking;
    means for generating a plurality of characters by placing said positive going and negative going pulses in a pattern of contiguous pulses to form a signal with coarse structure marking which is long compared to said pulses; and
    means for transmitting said signal with coarse structure marking as a radar signal.

12. A method of forming a radar signal, comprising the steps of:
    generating positive-going and negative-going pulses without a sinusoidal carrier as a fine structure marking;
    generating a sequence of characters by placing said positive-going and negative-going pulses in a pattern of contiguous pulses; and
    summing selected characters from among the plurality of characters to form a signal with coarse structure marking that is long compared to said pulses.

13. A radar receiver for selective reception of received radar signals transmitted with a coarse structure marking and without a sinusoidal carrier as a fine structure marking, comprising:

delay circuits means for generating at least one delayed replica of a received signal; and at least one summing circuit means for summing the received signal and delayed replicas, thereby generating an enhanced received signal.

14. A radar receiver for selective reception of received radar signals transmitted with a coarse structure marking and without a sinusoidal carrier as a fine structure marking, comprising:

delay circuits means for generating at least one delayed replica of a received signal;

inverter means for inverting selected ones of said delayed replicas; and at least one summing circuit means for summing selected signals from among the received signal and delayed and inverted delayed replicas, thereby generating an enhanced received signal.

15. The radar system of either claim 13 or claim 14, further comprising Doppler processor means for further eliminating unwanted signals and noise in the return signal.

16. A carrier free radar transmission system capable of generating positive going and negative going pulses and a contiguous pattern of said pulses to form a character, comprising:

means for generating a plurality of characters each starting after the preceding character by a predetermined interval; and means for transmitting said plurality of characters as a signal wherein said predetermined intervals define a delay time of each character to a first character of the signal, thus generating a signal with a coarse structure marking.

17. The radar transmission system of claim 16 wherein a first character is not necessarily identical to any other character in the plurality of characters.

18. The radar transmission system of claim 16 wherein a first character may be an amplitude inversion of second character in the plurality of characters.

19. The radar transmission system of claim 16 wherein each predetermined interval is different from all other predetermined intervals.

20. The radar transmission system of claim 16 wherein each predetermined interval is greater than the signature of the largest expected target.

21. A radar receiver for selective reception of a received signal with a coarse structure marking and without a sinusoidal carrier as a fine structure marking, comprising:

means for delaying the received signal by a plurality of delay times to form a plurality of delayed received signals;

means for inverting selected delayed received signals from among the plurality of delayed received signals to form a plurality of inverted delayed received signals; and at least one summing circuit means for summing the inverted delayed received signals together with the received signal and selected delayed received signals to selectively receive a transmitted signal with coarse structure marking.

* * * * *